No. 866,952. PATENTED SEPT. 24, 1907.
G. W. McKEE.
METER CONNECTION.
APPLICATION FILED JAN. 25, 1907.

WITNESSES: INVENTOR:
Anna M. Dow Garnet W. McKee
Anna M. Mayer By Barthel & Barthel
Attorneys.

UNITED STATES PATENT OFFICE.

GARNET W. McKEE, OF DETROIT, MICHIGAN.

METER CONNECTION.

No. 866,952.　　　Specification of Letters Patent.　　　Patented Sept. 24, 1907.

Application filed January 25, 1907. Serial No. 353,967.

*To all whom it may concern:*

Be it known that I, GARNET W. McKEE, a citizen of the United States of America, residing at Detroit, in the county of Wayne and State of Michigan, have invented certain new and useful Improvements in Meter Connections, of which the following is a specification, reference being had therein to the accompanying drawings.

This invention relates more specifically to connection for gas meters and has for its primary object to make the connection secure against leakage of gas.

In the present practice of installing gas the service and supply pipes are first put in place and the terminals are extended along the walls or ceiling as circumstances may permit to near the place where the meter is supposed to be placed, the meter is then located and usually connected up by means of lead pipe connections. In making these connections the service pipe and the supply pipe are connected to the inlet and outlet terminals of the meter wholly independent of each other and as those connections under the conditions existing may extend at various angles and form various bends it is quite obvious that even with a liberal use of lead pipe more or less strain will always be exerted by these connections on the couplings which have to be used to connect the terminals of the lead pipe to the meter and form a prolific source of gas leakage. My invention eliminates all gas leakage arising from this source, by connecting both meter terminals to what I call a coupling head and connect the service and supply pipes to the coupling head instead of to the meter. The coupling head thus acts as a rigid connection and distance bar between the meter couplings and relieves them of all strain. Besides the use of lead pipe is entirely obviated, thereby reducing not only the cost of making all connections but also doing away with the annoyance caused by having the lead pipe connections stolen while the meter is removed.

Figure 1:
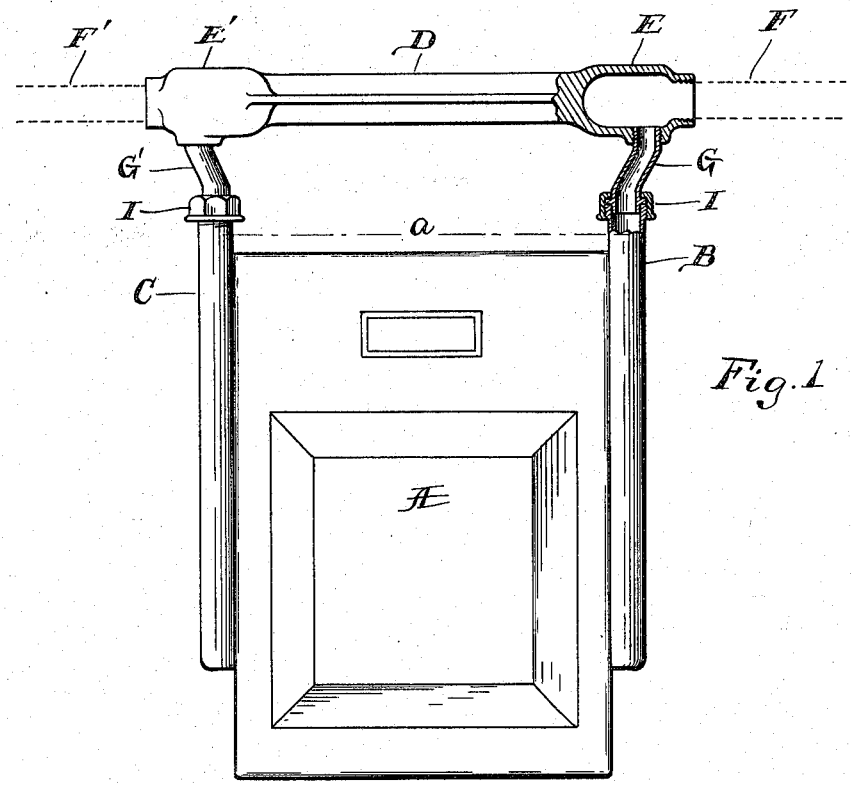
Figure 2:
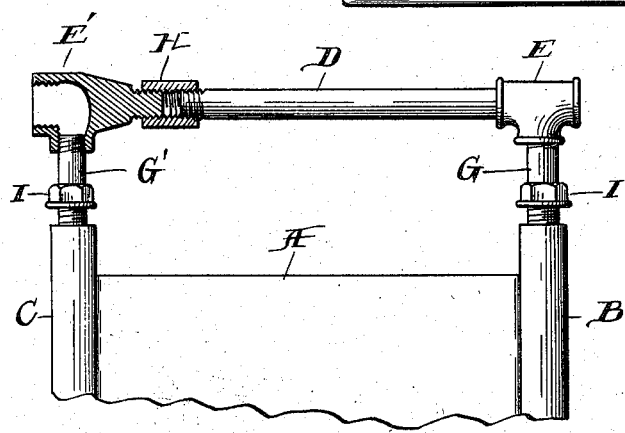
Figure 3:
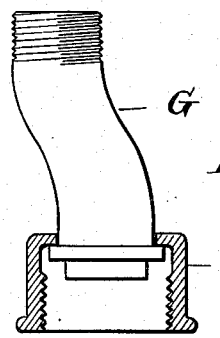

In the drawings which accompany this specification:—Figure 1 is an elevation partly in section showing a preferred form of applying my invention; Fig. 2 is a similar elevation embodying a modification; Fig. 3 is a detached sectional elevation of the offset coupling stud used with the connection shown in Fig. 1.

Referring to the drawings A represents a gas meter of the kind in present use B and C being the inlet and outlet terminals thereof with which the connection is to be made.

D is the coupling head formed at opposite ends with separate inlet and outlet openings E, E' to which the ends of the supply pipe F and of the service pipe F' are adapted to be connected in the usual manner.

G, G' are two coupling studs secured in the ends of the header at right angles thereto and communicating with the inlets and outlets E, E' respectively. These coupling studs are of the known character used for making detachable couplings and are adapted to coöperate with the inlet and outlet terminals of the meter which are provided with coöperating coupling members I as in the usual construction of meters. These coupling studs may be straight tubes of brass, as shown in Fig. 2, or the two ends of the stud may be axially offset as shown in Figs. 1 and 3, the latter form providing a means of adjustment for accurately registering the coupling studs with the coupling members of the meter, there being often a considerable variation in the distance $a$ between the coupling members I, this variation being one of the reasons why heretofore it has been found necessary to use lead pipe connections.

By making the axial offset between the two ends of the coupling stud $\frac{3}{16}$ of an inch the distance $a$ may vary between different meters within $\frac{3}{8}$ of an inch and yet be within the range of adjustment of the coupling studs. Fig. 1 shows the coupling studs as adjusted for the maximum distance and it will be understood that by giving each coupling stud a half turn the minimum distance will be obtained and between these limits the studs can be adjusted to any variation. There is another way of obtaining this adjustment which is shown in Fig. 2 and consists in making the coupling head itself adjustable in length by means of an extension joint H and this adjustment may provide for a very wide limit if desired. Where meters are however made of uniform standard size there would be no call for these adjusting features.

As the inlet and outlet connections B C in the coupling head do not communicate with each other the connecting portion may be formed solid and of any desirable cross section and while I consider it preferable to cast the whole head in one piece to avoid multiplication of joints which may form sources of leakage, it is obvious that the bar may be composed of separate parts rigidly connected together.

It will be understood that the coupling head may be installed with the piping and the meter afterwards connected to it, but which ever way the work is done, there is no lead pipe needed to make the connections and whatever strain the service and supply pipes may be subjected to the meter couplings will not be affected thereby.

I have shown the coupling head as having the inlet and outlet connections formed in axial line therewith, but it is obvious that they may be formed at any angle thereto without altering my invention.

Having thus fully described my invention what I claim is:—

1. The combination with a gas meter provided with inlet and outlet connections on top thereof, of a coupling head provided with hollow ends, service and supply pipes connected to said hollow ends respectively and supporting the coupling head in a horizontal position adjacent to and above the top of the meter and coupling studs at the ends of the coupling head projecting downwardly and registering with the inlet and outlet of the meter, said coupling studs communicating through the hollow ends of the coupling head with the service and supply pipes respectively and provided at their lower ends with coupling members to which the inlet and outlet of the meter are connected respectively.

2. The combination with the gas meter provided with inlet and outlet connections on top thereof, of a coupling head provided with hollow ends, service and supply pipes connected to said hollow ends and supporting the coupling head in a horizontal plane adjacent to the top of the meter, coupling studs screw-threaded into the coupling head at right angles thereto and projecting downwardly, said coupling studs registering with the inlet and outlet connections of the meter and communicating through the hollow ends of the coupling head with the service and supply pipes respectively and coupling nuts at the lower end of the coupling studs adapted to detachably connect the meter inlet and outlet with said studs.

3. The combination with a gas meter provided with inlet and outlet connections on top thereof, of a coupling head provided with interiorly screw-threaded hollow ends, the intermediate portion of the coupling head being solid, service and supply pipes screw-threaded into the hollow ends and supporting the coupling head in a horizontal plane adjacent to the top of the meter and coupling studs at the opposite ends of the coupling head adapted to be adjusted to register accurately with the inlet and outlet connections of the meter, said coupling studs communicating through the hollow ends of the coupling head with the service and supply pipes respectively and provided at their lower ends with coupling members adapted to detachably connect the inlet and outlet connections of the meter to said coupling studs.

4. In combination with the meter having inlet and outlet and with the supply and service pipes of the meter, a rigid coupling head formed with openings in its opposite ends to which the supply and service pipes are respectively connected, coupling studs at the ends of the coupling head communicating with the supply and service pipes respectively through the openings in the coupling head and cooperating coupling members at the meter inlet and outlet detachably connecting the same to the coupling studs, said coupling studs formed with axial offsets adapted to adjust the same in relation to the inlet and outlet of the meter.

In testimony whereof I affix my signature in presence of two witnesses.

GARNET W. McKEE.

Witnesses:
OLIVER E. BARTHEL,
OTTO F. BARTHEL.